July 2, 1968     E. H. NATSCHKE ET AL     3,390,590

BRAKE OPERATOR INCLUDING SCREW WITH STOP MEANS

Filed Oct. 3, 1966     6 Sheets-Sheet 1

Inventors
Eldred H. Natschke
and Thomas J. Macku
By Mann, Brown & McWilliams
Attys.

Inventors
Eldred H. Natschke
and Thomas J. Macku
By Mann, Brown & McWilliams
Attys.

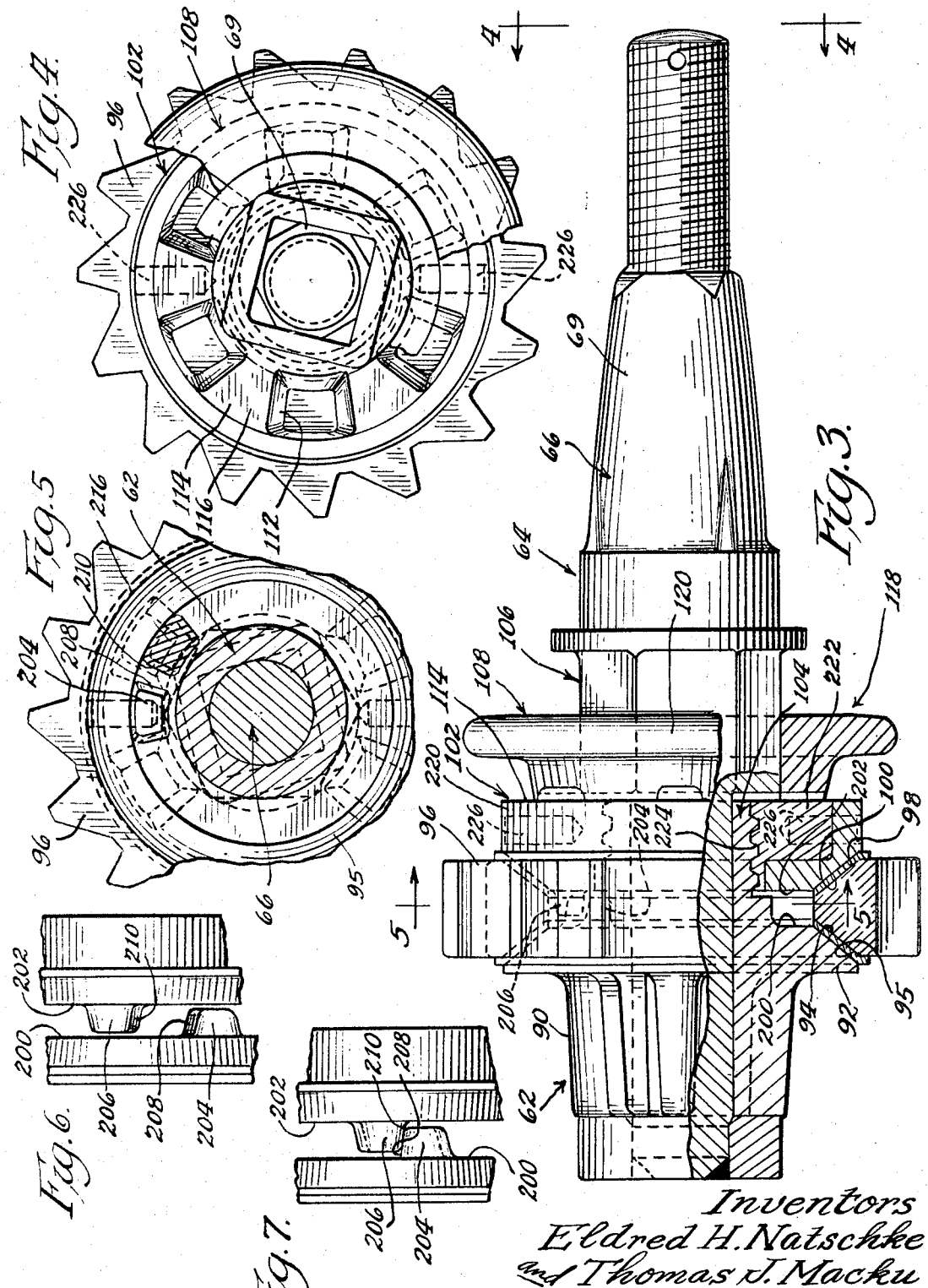

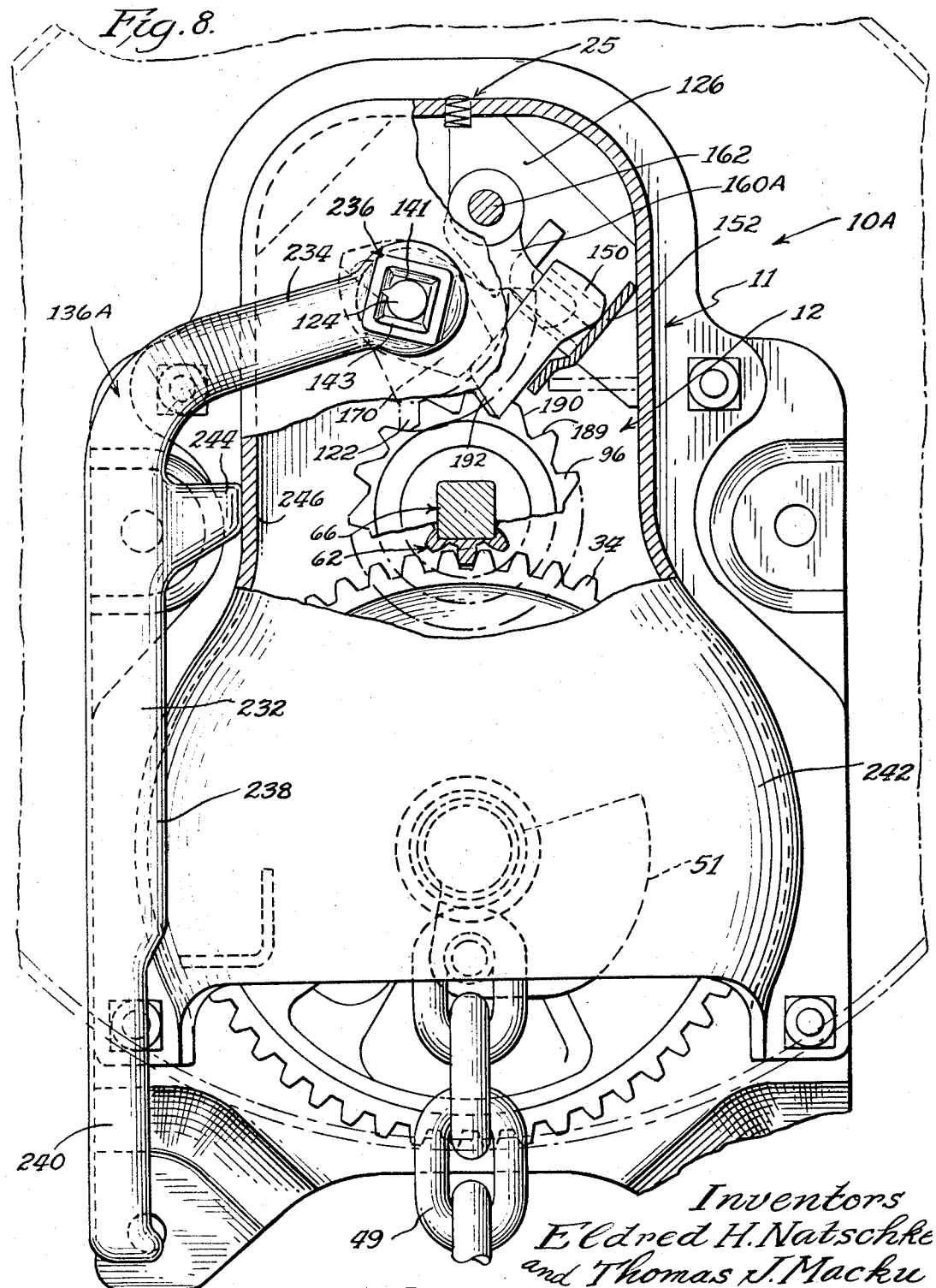

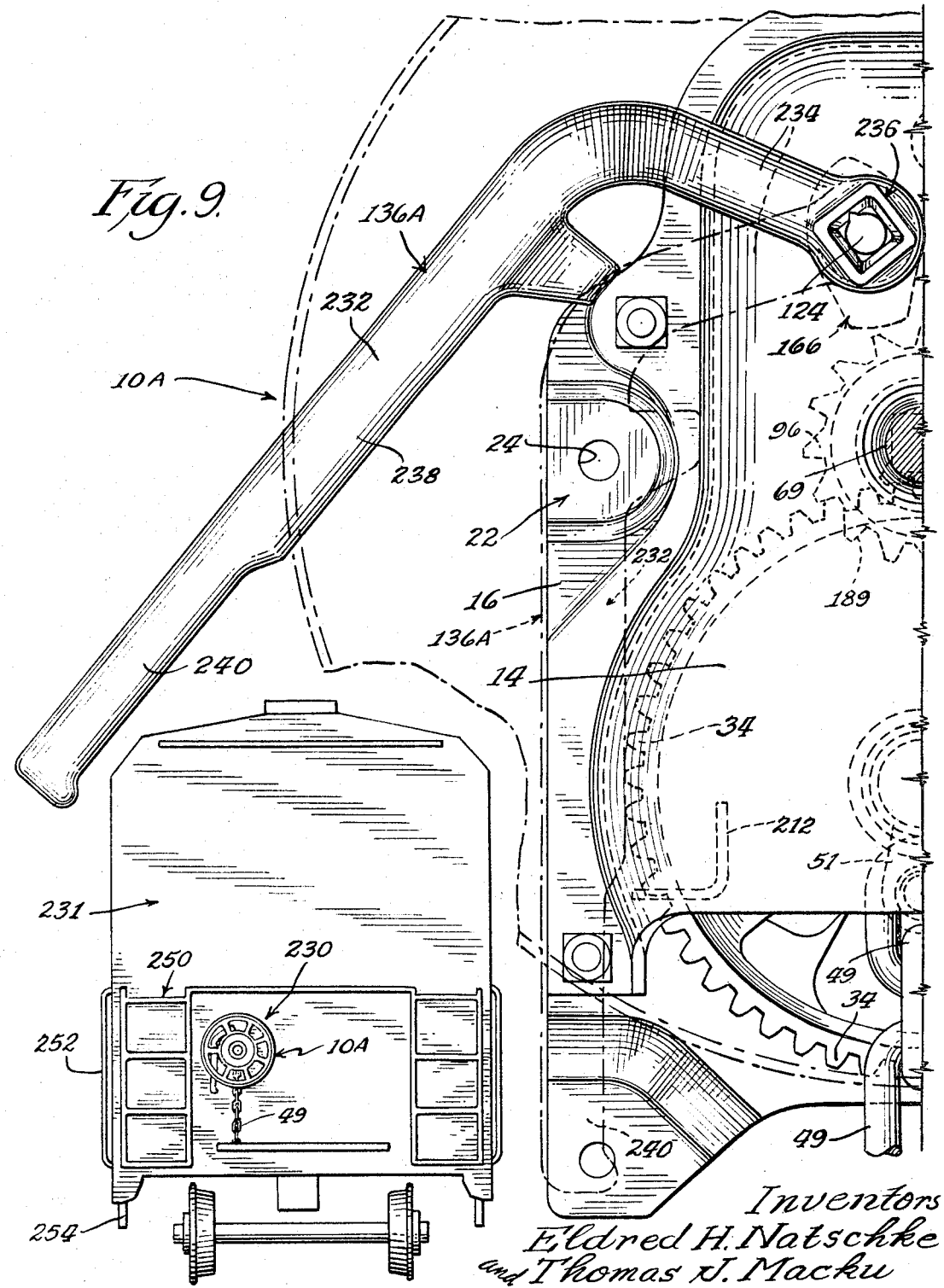

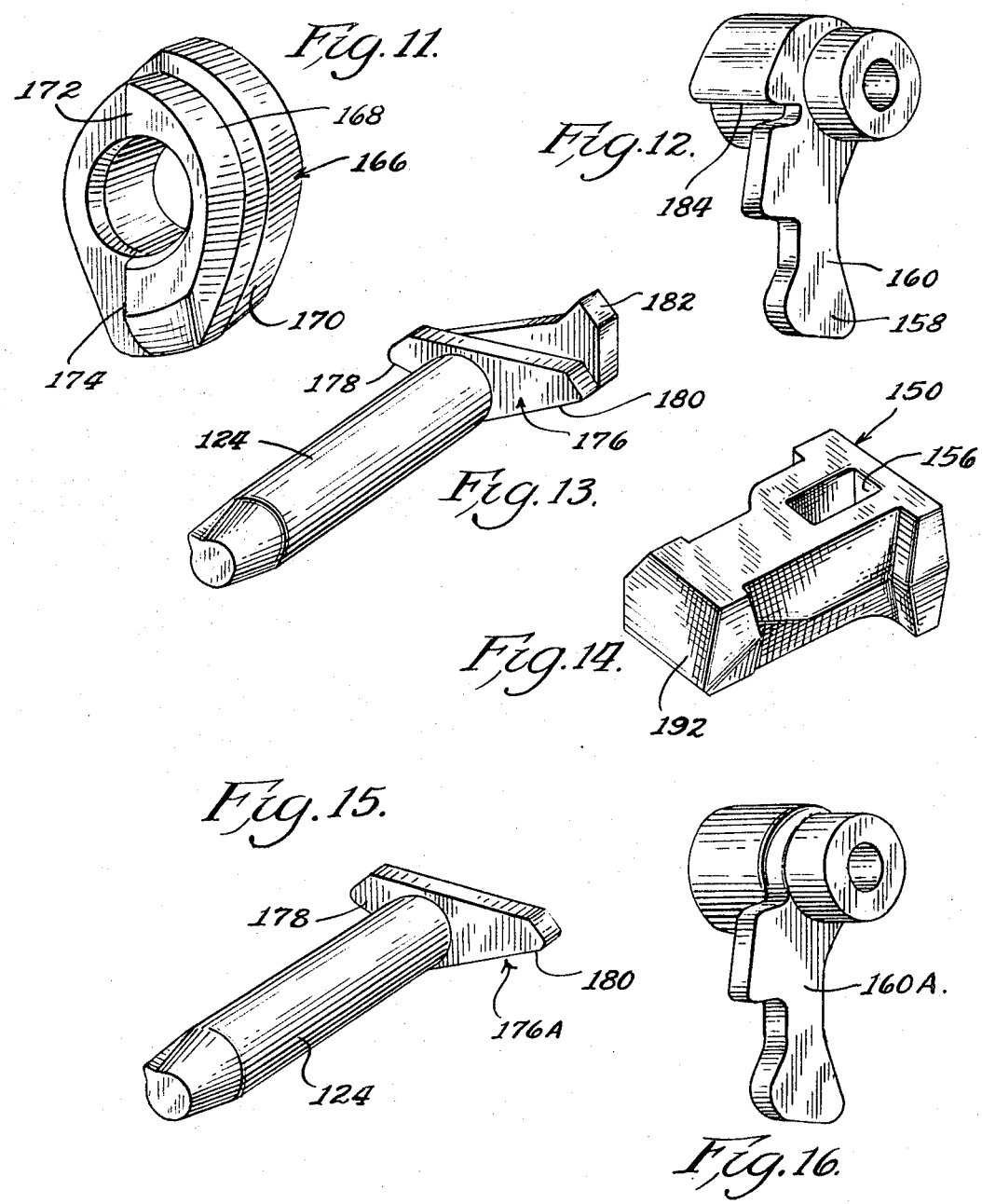

United States Patent Office 3,390,590
Patented July 2, 1968

3,390,590
BRAKE OPERATOR INCLUDING SCREW
WITH STOP MEANS
Eldred H. Natschke, Kankakee, and Thomas J. Macku, Worth, Ill., assignors to Universal Railway Devices Co., a corporation of Delaware
Filed Oct. 3, 1966, Ser. No. 583,641
7 Claims. (Cl. 74—505)

This invention relates to a hand brake for railroad cars, and more particularly, to improvements in the hand brake arrangements shown in U.S. Patents Nos. 2,318,569 and 2,848,083.

The hand brake arrangement shown in said Patent 2,848,083 is an improvement over that shown in Patent 2,318,569 and pertains to a non-spin vertical hand wheel type brake in which a two way brake release is provided whereby the brake may be operated for quick release or released gradually under the control of the operator.

A principal object of the present invention is to provide generally improved hand brake arrangements of the type disclosed in Patent 2,848,083.

Another specific object of the invention is to provide an operating shaft assembly arrangement for hand brakes of this type in which the pinion and clutch nut carried thereby are positively stopped when quick release of the brake is effected to avoid any elongation action on the operating shaft that could deform the housing and cause damage to the bearings journalling the shaft.

Another important object of the invention is to provide a novel bottom release handle arrangement for hand brakes of this type.

Still other objects of the invention are to provide a generally improved hand brake arrangement that is economical of manufacture, convenient to install and safe and efficient in use.

Other objects, uses and advantages will be obvious or become apparent from a consideration of the following detailed description and the application drawings.

In the drawings:

FIGURE 3 is a plan view of the hand wheel operating shaft of FIGURES 1 and 2 with parts being shown in section and illustrating the ratchet wheel as it is associated with the operating shaft friction clutch assembly and other details of construction;

FIGURE 4 is an elevational view of the right hand end of the shaft assembly as it is shown in FIGURE 3, taken approximately along line 4—4 of FIGURE 3, with parts broken away to expose other parts;

FIGURE 5 is a diagrammatic fragmental cross-sectional view substantially along line 5—5 of FIGURE 3, diagrammatically illustrating the novel integral lug type stop arrangement for the nut of the shaft assembly of FIGURE 3;

FIGURES 6 and 7 are fragmental plan views of the integral lug arrangement illustrated in FIGURE 5;

FIGURE 8 is a view similar to that of FIGURE 1 but illustrating a modified form of the invention employing a bottom release handle, with parts being broken away to expose other parts;

FIGURE 9 is a fragmental view similar to that of FIGURE 8 but illustrating the two operating positions of the bottom release handle;

FIGURE 10 is a small scale end elevational view of a railroad boxcar showing a typical application of the hand brake of FIGURES 8 and 9;

FIGURES 11–14 are diagrammatic perspective views illustrating specific components of the ratchet wheel pawl control arrangement that is operated by the release handle of the embodiment of FIGURES 1–7; and FIGURES 15 and 16 illustrate modifications of these components that are incorporated in the hand brake arrangement of FIGURES 8–10.

However, it is to be distinctly understood that the specific drawing illustrations provided are supplied to disclose several practical embodiments of the invention, and the invention may take other embodiments that will be obvious to those skilled in the art.

Figure 1:
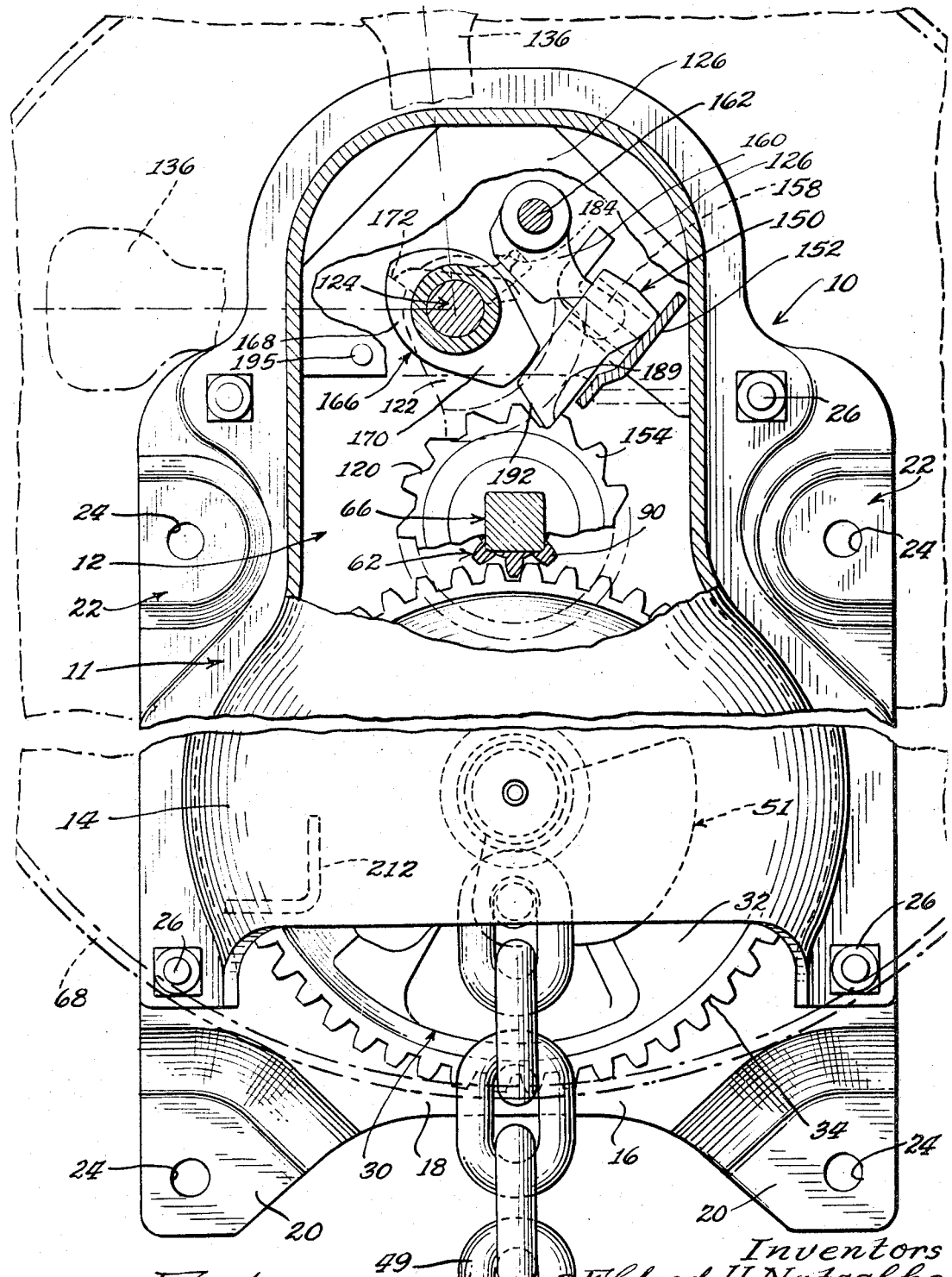
FIGURE 1 is a front elevational view of the improved hand brake with parts broken away to expose other parts and with the release handle being partially shown in its two operating positions in broken lines.
Figure 2:
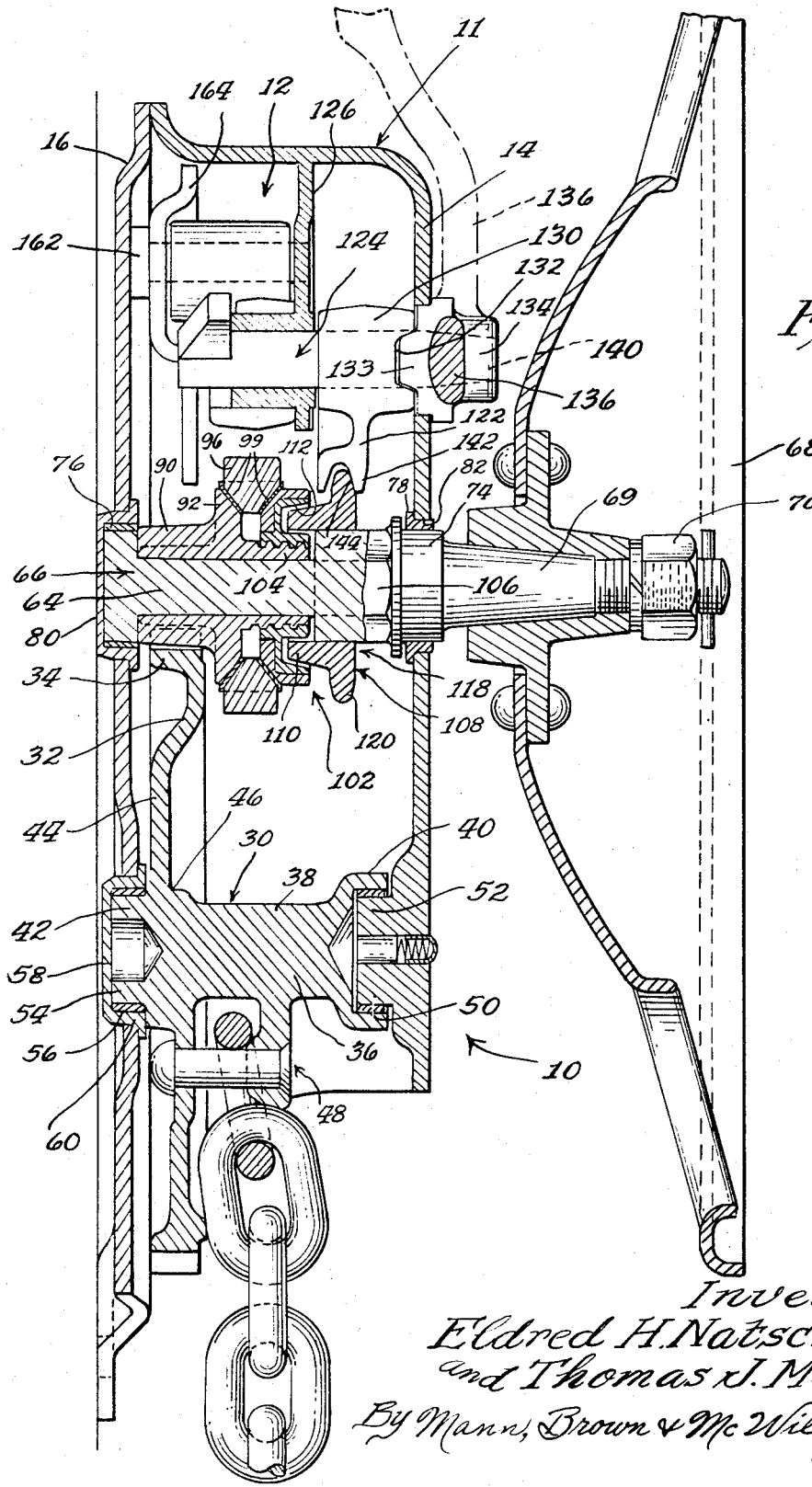
FIGURE 2 is a vertical sectional view of the hand brake shown in FIGURE 1 on a somewhat smaller scale.

Reference numeral 10 of FIGURES 1 and 2 indicates one embodiment of the invention positioned as it would be applied to a railroad car, in which the brake operating mechanism is indicated at 12 and is contained in a housing 11.

The housing is in two sections comprising a front casing 14 and a back section or attaching plate 16 defining a body portion 18 formed with a pair of lower attaching lugs 20 and a pair of recesses 22, each formed with appropriate bolt holes 24 for receiving appropriate attachment bolts or the like to secure the back plate or section to the car.

The front casing 14 includes a suitable oil cap indicated at 25 and is secured to the back section or attaching plate 16 by appropriate bolts indicated at 26. The major portion of the brake operating mechanism 12 is mounted within this casing and in such a manner as to be removable with it.

The brake operating mechanism comprises a brake drum 30 that includes a flange portion 32 provided with an integral gear 34 at its rim for turning the drum. The gear and drum are preferably made in accordance with U.S. Patent 2,723,832 and thus the drum comprises a hub 36 defining a drum portion 38 and enlarged end portions 40 and 42 with the flange 32 being in the form of a dished plate 44 welded or otherwise secured to the hub enlarged portion 42 as at 46. The drum may be provided with suitable means for attaching the end link of the brake chain 49 to the drum and this may take the form of the chain anchor and guide described in said Patent 2,723,832 and indicated at 51 in FIGURE 1.

The enlarged end 40 of the hub 36 is recessed to receive a brass bushing 50 that cooperates with a boss 52 formed in the front casing 14. The enlargement 42 is formed with a cylindrical portion 54 that receives a brass bushing 56 mounted in a dished bearing retainer 58 which is received in opening 60 of housing section 16.

The gear 34 meshes with a pinion 62 journaled on a reduced portion 64 of operating shaft 66 to which the hand wheel 68 is keyed in any suitable manner. In the form shown, the operating shaft 66 is formed with an outwardly extending tapered portion 69 on which the hand wheel 68 is received and against which the hand wheel 68 is clamped by appropriate nut 70 or other suitable restraining means.

The shaft 66 includes enlarged portions 72 and 74 which are respectively journaled in a brass bushing 76 and a phosphor bronze bushing 78 mounted in the housing casing and back plate, respectively. Brass bushing sleeve 76 is received in a retainer element 80 that is similar to element 58 while bushing 78 is applied directly to opening 82 of housing section 14 by being pressed into same.

As indicated in FIGURES 2 and 3, the pinion 62 comprises a gear portion 90 and a clutch collar portion 92 formed with a conical friction face 94 that is intended to cooperate with similarly formed friction face 95 of ratchet wheel 96. The other side of ratchet wheel 96 is formed with a similar friction face 98 that is intended to cooperate with friction face 100 of nut 102 that is threadedly mounted on a threaded portion 104 of pinion 62. In the form illustrated, friction clutch faces 94 and 95, and 98 and 100 are separated by annular brass cone members 99 that complement the respective surfaces therebetween and are free to float with respect thereto.

Operating shaft 64 is formed with a hex-shaped portion 106 on which is slidably mounted a jaw clutch sleeve 108 provided with jaws 110 that are proportioned and spaced to fit into recesses 112 formed in face 114 of nut 102 that define cooperating teeth 116 of the nut that completes the toothed or jaw clutch between the operating shaft 64 and the nut that is generally indicated at 118.

The clutch sleeve 108 is provided with a radial flange 120 which is engaged by a grooved cam member 122 keyed to release handle shaft 124 that is journaled between casing 14 and a bracket plate 126 which is mounted therein. Cam member 122 includes a hub portion 130 that is received over shaft 124 and is formed with spaced indentations 132 that receive the similarly spaced projections 133 of the hub portion 134 of release handle 136 that is affixed to its shaft 124 in any suitable manner. The tapered portion of shaft 124 indicated at 140 is given a polygonal and keying configuration 141 to conform with a similar polygonal and key receiving configuration 143 of handle hub portion 134 for keying the handle to shaft 124 (shown in connection with the modified release handle of FIGURE 8). These parts are fixed against separation in any suitable manner, such as by welding.

The cam member 122 is formed with a rim portion 142 defining a camming groove 144 in which the radial flange 120 of clutch sleeve 108 is mounted. The camming surface 144 is given the configuration that will move the teeth 110 of clutch sleeve 108 from the recesses 112 of nut 102 as the release handle is moved from the lower broken line position of FIGURE 1 to the upper broken line position of that figure (the full brake release position).

Also controlled by the release handle 136 is a pawl 150 that is slidably mounted on a support plate 152 affixed to the plate 126 in any suitable manner which pawl engages in the teeth 154 of ratchet wheel 96. Pawl 150 is provided with an opening 156 (see FIGURE 14) in which is received the end 158 of operating arm or finger 160 that is journalled by headed pin 162 between the plate 126 and the supplemental bracket plate 164 mounted within the front casing 14.

Also mounted on the release handle shaft 124 is a holding pawl stop member 166 which is in the form of a sleeve portion 168 and a pawl engaging arm 170. The sleeve 168 is rotatably mounted on the shaft 124 and is provided with a pair of shoulders 172 and 174 that are about 180 degrees apart. The shaft 124 is provided with a flange structure 176 at its inner end (see FIGURE 13) which is formed with a shoulder 178 for engaging the shoulder 172 of the sleeve 168 when the release handle 136 is moved to the brake holding position (that is, the lower position of FIGURE 1). The flange portion is also formed with a shoulder 180 positioned to engage the shoulder 174 of sleeve portion 168 to move pawl engaging arm 174 out of engagement with the pawl as the release handle 136 is moved to the upper position of FIGURE 1.

The flange portion 176 of shaft 124 also includes a finger or lug portion 182 which engages under shoulder 184 of pawl actuating arm or finger 160 (see FIGURE 12).

The parts associated with the pawl are so constructed that when the release handle 136 is in the lower position of FIGURE 1, the shoulder 178 of shaft 124 will engage the shoulder 172 of pawl stop sleeve 168 thereby holding the pawl stop arm 170 in the position shown in FIGURE 1 and against the pawl, which will thus be held against partial rotation; thus, the ratchet wheel is held from rotating in a direction which will release the brake (that is, a counterclockwise direction in the showing of FIGURE 1). But when the ratchet wheel is moved through hand wheel 68 and the intervening clutch device in a clockwise direction, the inclined surfaces 190 of the ratchet wheel teeth 154 will engage the inclined surface 192 of the pawl thereby causing the pawl to slide upwardly and lengthwise of its axis until the tooth has passed the pawl whereupon the pawl will drop into the space between the next adjacent teeth for abutting engagement with the next toothed surface 189.

During upward movement of the pawl, the finger 160 will be moved by the pawl in a counterclockwise direction and since the shoulder 184 is in engagement with lug portion 182, the weight of handle 136 will tend to positively force the pawl downwardly between the teeth.

The operation of the hand brake device as so far described is as follows: Assuming that the hand brake is released, in its normal inoperative position the release handle 136 will be positioned in the lower position of FIGURE 1, which brings the teeth of clutch sleeve 108 into engagement with the teeth receiving recesses 112 of nut 102 and biases pawl 150 toward the ratchet wheel. Rotation of the hand wheel 68 in the direction to wind up the brake (clockwise of FIGURE 1) will turn nut 102 towards clutch collar 92 of pinion 62 and bind the ratchet wheel 96, the pinion 62, and the operating shaft 66 into one rotating unit which will rotate the drum 30 in the direction to wind up the brake. During this operation, the pawl 150 moves back and forth under the action of teeth 154 and gravity until the brake is set. The release handle 136 remains in the lower position of 136 so that when the brake is wound up and the pawl 150 is returned to its full line position of FIGURE 1, the brake is fully set.

If it is desired to gradually release the brake, handle 68 is rotated in a counterclockwise direction a slight amount which will have the effect of loosening nut 102 and thus the clutching surfaces between ratchet wheel and pinion 66 so that the pinion will rotate with respect to the ratchet wheel and shaft 66 under the control of the operator, who by slight loosening or tightening movements can increase or decrease the frictional drag on the rotational movement of the pinion 62 and thus fully control brake release.

When it is desired to provide a free release of the brakes, the release handle 136 is moved from the lower position of FIGURE 1 to the upper position of FIGURE 1, which withdraws the teeth 110 of jaw clutch 118 from recesses 112 of nut 102 and moves pawl engaging arm 170 out of contact with the pawl so that the ratchet wheel, pinion and drum freely rotate to release the brakes. As soon as handle 136 is released, it automatically returns to its lower position of FIGURE 1 since it cannot be raised beyond the vertical position. It is preferred that the amount of movement between the horizontal position of FIGURE 1 and the upper position of the same figure be on the order of 84 degrees, and stop pin 195 affixed to bracket plate 126 in the path of movement of cam member 122 provides for the released position of handle 136.

Referring now to the details of FIGURES 3–7, in accordance with this invention, the annular transverse face 200 of clutch collar 94 and the annular transverse face 202 of nut 102 (which define annular space 203 under ratchet wheel 96) are each provided with a pair of integrally formed lugs 204 and 206, respectively. Lugs 204 and 206 are each formed with opposing surfaces 208 and 210, respectively, that come into abutting relation at the end of the brake quick release action to stop rotational movement of nut 102 with respect to pinion 90.

When the hand wheel 68 is operated to lock ratchet wheel 96 against movement with respect to pinion 66, nut 102 rotates relative to pinion 66 to move the lug 206 away from the lug 204, but to move lug 206 towards clutch collar 92 axially of shaft 66.

When the hand wheel 68 is moved in the opposite direction to release the ratchet wheel for controlled release of the brakes, the lug 206 is moved towards lug 204, with the lug 204 serving as the limit of loosening action for the clutch holding ratchet wheel 96.

When the brakes are given a quick release, the pinion and nut remain in clamping engagement with the ratchet wheel and spin freely on the shaft 66 under the action of the tension in the rigging on the brake chain, clutch sleeve 108 having been separated from nut 102. When the brake chain hits the chain stop 212 (which is an angle member secured within casing 14), the motion of the pinion gear stops abruptly while the nut continues, under its own momentum, to rotate on the threaded portion of the pinion until its lug 206 engages lug 204 of the pinion clutch collar 92. This stops the spinning motion of the nut relative to the pinion. Without this means of preventing the continued spinning action of nut 102, the threading action involved would tend to create opposing thrust actions on the parts involved that would tend to force to the left the left-hand bearing of the hand wheel shaft 66 and bulge the casing 14 outwardly or to the right of FIGURE 2.

It is preferred that the pinion 62 including its clutch collar and lug 204 be one integral forged part while the nut member is preferably a composite unit comprising an outer rim member 220 which is one forged part including its lug 206 and a core member 222 which is internally threaded as at 224 to cooperate with the threading of the pinion threaded portion 104 that is also formed with the teeth receiving indentations 112. Members 220 and 222 of nut 102 are keyed together by diametrically opposed pins 226 which hold these members against any relative shifting movement. Pins 226 should be locked in place by any suitable manner. The pins 226 serve only as a direct shear connection between the parts of the nut 102.

Referring now to the embodiment of FIGURES 8–10, this hand brake unit 10A is especially adapted for the low position mounting indicated at 230 in FIGURE 10 at the end of a boxcar or the like.

The hand brake 10A comprises substantially identical brake components as those described in connection with the embodiment of FIGURES 1–7, as indicated by corresponding reference numerals. However, hand brake 10A is provided with a special bottom release handle 136A in the form of an L-shaped member 232 comprising a relatively short leg 234 formed with a socket portion 236 that is affixed to the shaft 124, and an elongate leg 238 formed with a hand grip portion 240 which is disposed to one side of the lower enlarged portion 242 of casing 14.

The brake holding or locking positions of arm or handle 136A is shown in FIGURE 8 and in this position, abutment 244 rests under the action of gravity against the side wall 246 of casing 14. The handle 136A to give quick release is thrown to the full line position of FIGURE 9, and in accordance with this arrangement the angle of throw is made approximately 40 degrees by suitably proportioning to perform their intended functions the cam member 122 and other parts of the hand brake that are actuated through rotation of shaft 124.

In this embodiment of the invention, the shoulder 184 is omitted from the pawl engaging arm or pin 160A (see FIGURE 16) and the lug 182 of shaft 124 is likewise omitted from flange structure 176A (see FIGURE 15). It has been found that the pawl 150 returns to its ratchet wheel holding position without having to be biased by gravity acting on handle 136A.

The brake 10A when applied to the end of a railroad car 231 where indicated at 230 is thus readily operable by a brakeman standing on the lower rung of either the end or side ladders 250 or 252, respectively, or on the conventional stirrup 254. Also, the brakeman is able to operate the brake by pulling handle 136A toward him rather than having to reach up and over the hand brake to push the release handle away from him.

It will therefore be seen that we have provided a highly practical and efficient non-spin vertical wheel hand brake arrangement that is readily adapted for either top release or bottom release applications. This hand brake arrangement also provides the desirable two way release operation which permits either quick release of the brake or a controlled release under the control of the brakeman.

The foregoing description and the drawings are given merely to explain and illustrate our invention and the invention is not to be limited thereto, except insofar as the appended claims are so limited, since those skilled in the art who have our disclosure before them will be able to make modifications and variations therein without departing from the scope of the invention.

We claim:
1. In a hand brake for railroad cars including a housing adapted to be mounted on a car, an operating shaft journalled in the housing, pinion and ratchet means mounted on the shaft with said pinion means comprising a pinion rotatably mounted on the shaft and including a threaded portion, a nut mounted on the pinion threaded portion and a ratchet wheel rotatably mounted on the pinion between friction clutch faces of the pinion and nut and including friction clutch faces on either side thereof adapted for cooperation with the friction clutch faces of the pinion and nut respectively, a jaw clutch shiftably keyed to said drive shaft and adapted to clutch and unclutch with respect to said nut, brake holding means including pawl means mounted in said housing for holding said brake, hand lever release means for controlling said pawl means and for clutching and unclutching said jaw clutch, a winding drum journalled in said housing and coupled to said pinion, and means for rotating said operating shaft to wind up the brake drum, the improvement wherein:

said pinion and said nut comprise forged components formed to define opposed surfaces in concentric relation to said friction clutch surfaces, said opposed surfaces each including an integral lug projecting axially of said operating shaft, said lugs overlapping axially of said shaft and including opposed surfaces that engage each other after said jaw clutch has been declutched and said brake has been released thereby for stopping rotational movement of said nut relative to said pinion.

2. The improvement set forth in claim 1 wherein:

said nut component comprises a first annular internally threaded member threadedly mounted on said pinion threaded portion, and a second annular member keyed to said first annular nut member by keying means, said nut first annular member including annularly arranged jaw clutch receiving openings for jaw clutch cooperation with said jaw clutch, said nut second annular member including said nut friction clutch face and said nut lug.

3. The improvement set forth in claim 2 wherein said keying means comprises a pair of diametrically opposed pins received in aligned diametrically opposed openings in said nut members.

4. The improvement set forth in claim 1 wherein:

said hand lever means is of the top release type having a throw on the order of 84 degrees between holding and full release positions.

5. The improvement set forth in claim 1 wherein:

said hand lever means is of the bottom release type and comprises a downwardly extending handle having a throw on the order of 40 degrees between holding and full release positions.

6. The improvement set forth in claim 5 wherein:

said handle of said hand lever means further comprises a generally rectilinear portion disposed substantially vertically in the brake holding position thereof;

said handle being swingably journalled in said housing and coupled to said pawl means and said jaw clutch for actuating same to release the brake when swung upwardly of said housing.

7. The improvement set forth in claim 1 wherein:
said hand lever means includes a handle journalled in said housing,
and including means for coupling said handle to said pawl means and said jaw clutch for actuating same to release the brake when said handle is swung from its brake holding position to its brake release position,
said coupling means being arranged to avoid bobbing of said handle on gradual release of said brake through operation of said operating shaft in conjunction with said nut to controllably release said pinion from said ratchet wheel.

References Cited
UNITED STATES PATENTS

| | | | |
|---|---|---|---|
| 2,618,169 | 11/1952 | Mesereau | 74—505 |
| 2,848,083 | 8/1958 | Wilson | 192—16 |
| 3,173,305 | 3/1965 | Mesereau | 74—505 |
| 3,176,539 | 4/1965 | Mesereau | 74—505 |

BENJAMIN W. WYCHE III, *Primary Examiner.*